(12) United States Patent
Kim et al.

(10) Patent No.: US 12,542,651 B2
(45) Date of Patent: Feb. 3, 2026

(54) METHOD FOR PROCESSING HOMOMORPHIC ENCRYPTION AND ELECTRONIC APPARATUS

(71) Applicant: CRYPTO LAB INC., Seoul (KR)

(72) Inventors: Jung Woo Kim, Seoul (KR); Junbum Shin, Suwon-si (KR)

(73) Assignee: CRYPTO LAB INC., Seoul (KR)

( * ) Notice: Subject to any disclaimer, the term of this patent is extended or adjusted under 35 U.S.C. 154(b) by 78 days.

(21) Appl. No.: 18/594,558

(22) Filed: Mar. 4, 2024

(65) Prior Publication Data

US 2024/0297778 A1  Sep. 5, 2024

(30) Foreign Application Priority Data

Mar. 2, 2023 (KR) .................. 10-2023-0027979
Feb. 29, 2024 (KR) .................. 10-2024-0029382

(51) Int. Cl.
*H04L 29/06* (2006.01)
*H04L 9/00* (2022.01)

(52) U.S. Cl.
CPC .................... *H04L 9/008* (2013.01)

(58) Field of Classification Search
None
See application file for complete search history.

(56) References Cited

U.S. PATENT DOCUMENTS

| | | | |
|---|---|---|---|
| 8,130,947 B2* | 3/2012 | Kerschbaum | G06Q 20/3674 713/168 |
| 8,433,892 B2* | 4/2013 | Rane | H04L 9/008 713/150 |
| 10,038,562 B2* | 7/2018 | Gajek | H04L 9/3093 |
| 10,489,604 B2* | 11/2019 | Yoshino | G06F 21/6227 |
| 10,778,409 B2* | 9/2020 | Cheon | H04L 9/3093 |
| 10,917,235 B2* | 2/2021 | Gama | G06N 3/08 |
| 2012/0039473 A1* | 2/2012 | Gentry | H04L 9/3026 380/277 |
| 2018/0337788 A1* | 11/2018 | Gajek | H04L 9/14 |
| 2019/0034646 A1* | 1/2019 | Fujiwara | H04L 63/0428 |

* cited by examiner

*Primary Examiner* — Maung T Lwin
(74) *Attorney, Agent, or Firm* — Steinfl + Bruno LLP

(57) ABSTRACT

Disclosed is an electronic apparatus. The electronic apparatus includes: a memory storing a plurality of homomorphic encryptions and lookup table information; a communication apparatus configured to perform communication with an external apparatus; and a processor configured to retrieve the homomorphic encryption in response to a requested query, wherein the lookup table information stores data acquired by homomorphically encrypting keyword information and index information that respectively correspond to the plurality of homomorphic encryptions, and the processor is configured to retrieve the homomorphically encrypted index information by using received query information and the lookup table information in case of receiving the query information from the external apparatus, and control the communication apparatus to transmit the retrieved index homomorphic encryption to the electronic apparatus.

13 Claims, 12 Drawing Sheets

100

METHOD FOR PROCESSING HOMOMORPHIC ENCRYPTION AND ELECTRONIC APPARATUS

BACKGROUND

Field

The present disclosure relates to a method for processing a homomorphic encryption and an electronic apparatus, and more particularly, to a method for processing a homomorphic encryption that allows fast analysis and retrieval of the homomorphic encryption by using the lookup table information, and an electronic apparatus.

Description of the Related Art

In accordance with the development of communication technology and a growing spread of electronic apparatuses, efforts are continuously being made to maintain communication security between the electronic apparatuses. Accordingly, encryption/decryption technology is used in most communication environments.

In case that a message encrypted by the encryption technology is transferred to the other party, the other party may be required to perform decryption to use the message. In this case, the other party may waste resources and time in a process of decrypting encrypted data. In addition, the message may be easily leaked to a third party in case that the message temporarily decrypted by the other party for calculation is hacked by the third party.

A homomorphic encryption method is being studied to solve this problem. The homomorphic encryption method may acquire the same result as a value encrypted after performing the calculation on a plaintext even in case that the calculation is performed on an encryption itself without decrypting encrypted information. Therefore, various calculations may be performed without decrypting the encryption.

Meanwhile, in case of storing homomorphic encryption in a cloud environment, the calculation for the above-mentioned retrieval takes a lot of time to find or retrieve homomorphic encryption that matches a specific operation. Therefore, there is a need for a method for performing fast retrieval and analysis even in case that the data is stored in a form of the homomorphic encryption.

SUMMARY

The present disclosure provides a method for processing homomorphic encryption that allows fast analysis and retrieval of the homomorphic encryption by using the lookup table information, and an electronic apparatus.

According to an embodiment of the present disclosure, provided is an electronic apparatus including: a memory storing a plurality of homomorphic encryptions and lookup table information; a communication apparatus configured to perform communication with an external apparatus; and a processor configured to retrieve the homomorphic encryption in response to a requested query, wherein the lookup table information stores data acquired by homomorphically encrypting keyword information and index information that respectively correspond to the plurality of homomorphic encryptions, and the processor is configured to retrieve the homomorphically encrypted index information by using received query information and the lookup table information in case of receiving the query information from the external apparatus, and control the communication apparatus to transmit the retrieved index homomorphic encryption to the electronic apparatus.

The processor may be configured to control the communication apparatus to transmit the homomorphic encryption corresponding to the index information to the external apparatus in case of receiving the index information in a plaintext from the external apparatus.

The processor may be configured to compute a vector value having a predetermined size by using a keyword corresponding to each homomorphic encryption, homomorphically encrypt each of the computed vector value and the index information, and generate the homomorphic encryption by respectively disposing the homomorphically encrypted vector value and index information in a plurality of slots.

The processor may be configured to compute the plurality of keywords for each homomorphic encryption, and respectively dispose the plurality of homomorphically encrypted vector values corresponding to the plurality of keywords in the plurality of slots.

The processor may be configured to generate an empty mask indicating whether the index information is masked by performing homomorphic comparison calculation on the received query information and the keyword information, and generate an index homomorphic encryption by performing homomorphic calculation on the empty mask and the lookup table information.

The processor may be configured to generate the index homomorphic encryption by performing homomorphic multiplication calculation on the empty mask and the index information, and using the index information calculated by the multiplication.

The processor may be configured to receive, from the external apparatus, a new homomorphic encryption and the homomorphically encrypted keyword information for the new homomorphic encryption, generate an index for the new homomorphic encryption, store the received new homomorphic encryption in the memory, and update the lookup table information based on the index and the keyword information.

According to an embodiment of the present disclosure, provided is a method for processing an encryption of an electronic apparatus, the method including: storing a plurality of homomorphic encryptions; storing a lookup table including data acquired by homomorphically encrypting keyword information and index information that respectively correspond to the plurality of homomorphic encryptions; receiving query information from an external apparatus; retrieving the homomorphically encrypted index information by using the received query information and lookup table information; and transmitting the retrieved index homomorphic encryption to the electronic apparatus.

The method may further include: receiving the index information in a plaintext from the external apparatus; and transmitting the homomorphic encryption corresponding to the index information to the external apparatus.

The storing of the lookup table may include computing a vector value having a predetermined size by using a keyword corresponding to each homomorphic encryption, homomorphically encrypting each of the computed vector value and the index information, and generating the homomorphic encryption by respectively disposing the homomorphically encrypted vector value and index information in a plurality of slots.

In the computing of the vector value, the plurality of vector values corresponding to the plurality of keywords may be computed for each homomorphic encryption, and in the generating of the homomorphic encryption, the plurality of homomorphically encrypted vector values corresponding to the plurality of keywords may respectively be disposed in the plurality of slots.

The retrieving of the index information may include generating an empty mask indicating whether the index information is masked by performing homomorphic comparison calculation on the received query information and the keyword information, and generating an index homomorphic encryption by performing homomorphic calculation on the empty mask and the lookup table information.

In the generating of the index homomorphic encryption, the index homomorphic encryption may be generated by performing homomorphic multiplication calculation on the empty mask and the index information, and using the index information calculated by the multiplication.

The method may further include: receiving, from the external apparatus, a new homomorphic encryption and the homomorphically encrypted keyword information for the new homomorphic encryption; generating an index for the new homomorphic encryption; storing the received new homomorphic encryption; and updating the lookup table information based on the index and the keyword information.

According to an embodiment of the present disclosure, provided is computer-readable recording medium including a program for executing a method for processing an encryption, wherein the method includes: storing a plurality of homomorphic encryptions; storing a lookup table including data acquired by homomorphically encrypting keyword information and index information that respectively correspond to the plurality of homomorphic encryptions; receiving query information from an external apparatus; retrieving the homomorphically encrypted index information by using the received query information and lookup table information; and transmitting the retrieved index homomorphic encryption to the electronic apparatus.

According to the various embodiments of the present disclosure as described above, it is possible to perform the fast retrieval and analysis of the plurality of stored homomorphic encryptions by using the lookup table. In addition, it is possible to perform the retrieval and analysis using the various combinations of keywords by using the lookup table where the plurality of keywords may be registered.

DETAILED DESCRIPTION

Figure 1:
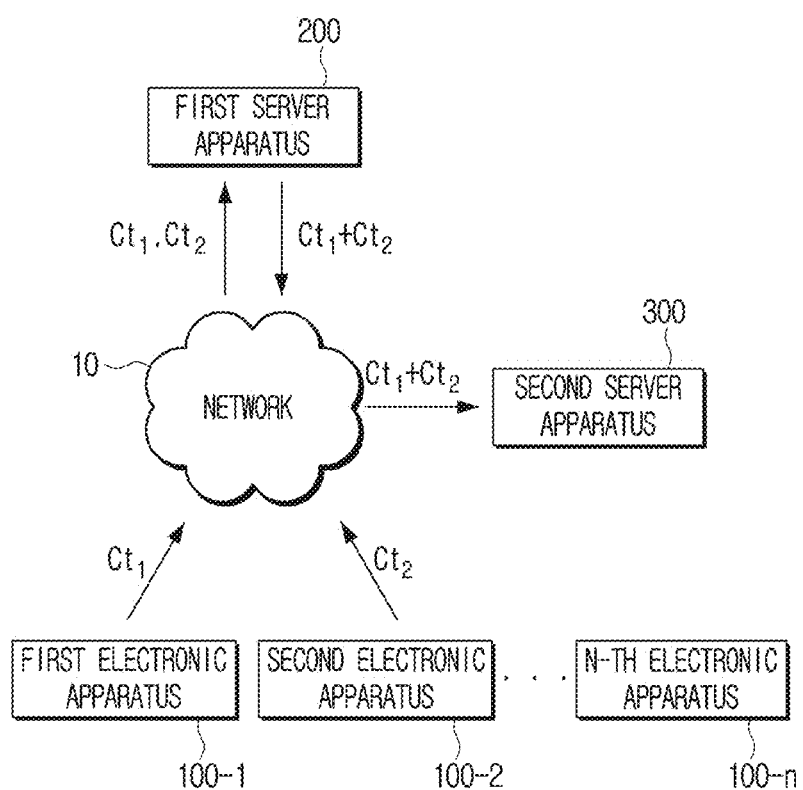
FIG. 1 is a view for explaining a structure of a network system according to an embodiment of the disclosure.

Hereinafter, the present disclosure is described in detail with reference to the accompanying drawings. Encryption/decryption may be applied as necessary to a process of transmitting information (or data) that is performed in the present disclosure, and an expression describing the process of transmitting the information (or data) in the present disclosure and the claims should be interpreted as including both the encryption/decryption cases even if not separately mentioned. In the present disclosure, an expression such as "transmission/transfer from A to B" or "reception from A to B" may include transmission/transfer or reception while having another medium included in the middle, and may not necessarily express only the direct transmission/transfer or reception from A to B.

In describing the present disclosure, a sequence of each operation should be understood as non-restrictive unless a preceding operation in the sequence of each operation needs to logically and temporally precede a subsequent operation. That is, except for the above exceptional case, the essence of the present disclosure is not affected even though a process described as the subsequent operation is performed before a process described as the preceding operation, and the scope of the present disclosure should also be defined regardless of the sequence of the operations. In addition, in the specification, "A or B" may be defined to indicate not only selectively indicating either one of A and B, but also including both A and B. In addition, a term "including" in the present disclosure may have a meaning encompassing further including other components in addition to components listed as being included.

The present disclosure only describes essential components necessary for describing the present disclosure, and does not mention components unrelated to the essence of the present disclosure. In addition, it should not be interpreted as an exclusive meaning that the present disclosure includes only the mentioned components, but should be interpreted as a non-exclusive meaning that the present disclosure may include other components as well.

In addition, in the present disclosure, a "value" may be defined as a concept that includes a vector as well as a scalar value. In addition, in the present disclosure, an expression such as "compute" or "estimate" or may be replaced with an expression of generating a result of the computation or estimation. In addition, the calculation on an encryption described below may indicate homomorphic calculation unless otherwise mentioned. For example, addition of homomorphic encryptions may indicate homomorphic addition of two homomorphic encryptions.

Mathematical calculations and computations of each step in the present disclosure described below may be implemented as computer calculations by a known coding method and/or coding designed to be suitable for the present disclosure to perform the calculations or computations.

Specific equations described below are exemplarily described among possible alternatives, and the scope of the present disclosure should not be construed as being limited to the equations mentioned in the present disclosure.

For convenience of explanation, the present disclosure defines the following notations.

a←D: Select an element a based on distribution D.

s1, s2∈R: Each of s1 and s2 is an element belonging to a set R.

mod(q): Perform modular calculation with an element q.

⌊•⌉: Round an internal value.

Hereinafter, various embodiments of the present disclosure are described in detail with reference to the accompanying drawings.

FIG. 1 is a view for explaining a structure of a network system according to an embodiment of the present disclosure.

Referring to FIG. 1, the network system may include a plurality of electronic apparatuses 100-1 to 100-n, a first server apparatus 200, and a second server apparatus 300, and the respective apparatuses may be connected to each other through a network 10.

This network system may be referred to as a cloud system, an electronic system, a data storage system, a storage system, or the like.

The network 10 may be implemented in various types of wired and wireless communication networks, broadcast communication networks, optical communication networks, cloud networks, or the like, and the respective apparatuses may be connected to each other in a way such as wireless-fidelity (Wi-Fi), Bluetooth, near field communication (NFC), or the like without a separate medium.

Although FIG. 1 shows the plurality of electronic apparatuses 100-1 to 100-n, the plurality of electronic apparatuses are not necessarily used, and one apparatus may be used. For example, the electronic apparatuses 100-1 to 100-n may be implemented in various types of apparatuses such as smartphones, tablets, game players, personal computers (PCs), laptop PCs, home servers, or kiosks, and may also be implemented in other types of home appliances each having an Internet of things (IoT) function. This electronic apparatus may be referred to as a client, a user apparatus, or the like.

A user may input various information through the electronic apparatuses 100-1 to 100-n used by the user. The input information may be stored in the electronic apparatuses 100-1 to 100-n themselves, and may also be transmitted and stored in an external apparatus for storage capacity or a security reason. In FIG. 1, the first server apparatus 200 may serve to store these information, and the second server apparatus 300 may serve to use some or all of the information stored in the first server apparatus 200.

Each of the electronic apparatuses 100-1 to 100-n may homomorphically encrypt the input information and transmit a homomorphic encryption to the first server apparatus 200.

Each of the electronic apparatuses 100-1 to 100-n may allow an error, that is, encryption noise computed in a process of performing the homomorphic encryption, to be included in the encryption. For example, the homomorphic encryption generated by each of the electronic apparatuses 100-1 to 100-n may be generated for a result value including a message and an error value to be restored in case of being later decrypted using a secret key.

As an example, the homomorphic encryption generated by each of the electronic apparatuses 100-1 to 100-n may be generated to satisfy the following property in case of being decrypted using the secret key.

$$Dec(ct, sk) = \langle ct, sk \rangle = M + e(\bmod\ q) \quad \text{[Equation 1]}$$

Here, < and > indicate dot product calculation (or usual inner product), ct indicates the encryption, sk indicates the secret key, M indicates a plaintext message, e indicates the encryption error value, and mod q indicates a modulus of the encryption. q needs to be chosen larger than the result value M multiplied by a scaling factor Δ to the message. In case that an absolute value of the error value e is sufficiently smaller than M, a decryption value M+e of the encryption may be a value that may replace an original message by the same precision in significant figure calculation. Among decrypted data, the error may be disposed on the least significant bit (LSB) side, and M may be disposed on the next least significant bit side.

The first server apparatus 200 may store the received homomorphic encryption as the encryption without decrypting the same.

In addition, the first server apparatus 200 may retrieve the homomorphic encryption corresponding to a request of the electronic apparatus and respond to a retrieval result to the electronic apparatus. In this case, the first server apparatus 200 may be referred to as a cloud server, a file server, a retrieval server, or the like.

The second server apparatus 300 may request a specific processing result for the homomorphic encryption from the first server apparatus 200. The first server apparatus 200 may perform specific calculation based on the request of the second server apparatus 300 and then transmit its result to the second server apparatus 300. Here, the specific calculation may not only be general calculation such as addition or homomorphic multiplication for the plurality of homomorphic encryptions but also be statistical calculation, for example, calculation such as mean, frequency distribution, linear regression, or covariance.

Here, the second server apparatus 300 may perform a combination operation on the plurality of homomorphic encryptions.

As an example, encryptions ct1 and ct2 transmitted by two electronic apparatuses 100-1 and 100-2 may be stored in the first server apparatus 200. In this case, the second server apparatus 300 may request the first server apparatus 200 for the sum of information provided from the two electronic apparatuses 100-1 and 100-2. The first server apparatus 200 may perform calculation of summing the two encryptions based on the request, and then transmit a result value ct1+ct2 to the second server apparatus 300.

Due to the property of the homomorphic encryption, the first server apparatus 200 may perform the calculation without the decryption, and the result value may also be the encryption. Here, the first server apparatus 200 may perform bootstrapping on a calculation result.

The first server apparatus 200 may transmit a calculation result encryption to the second server apparatus 300. The second server apparatus 300 may decrypt the received calculation result encryption and acquire a calculation result value of data included in each of the homomorphic encryptions. In addition, the first server apparatus 200 may perform the calculation several times based on a user request.

Meanwhile, FIG. 1 shows a case where the first electronic apparatus and the second electronic apparatus perform the encryption, and the second server apparatus performs the decryption, and the present disclosure is not limited thereto.

In addition, in the illustrated example, the first server apparatus 200 may be operated as the cloud server storing the plurality of encryptions. In this case, each of the electronic apparatuses 100-1 to 100-$n$ may generate a keyword for the homomorphic encryption in the transmission process of the homomorphic encryption described above, and transmit the generated keyword together to the first server apparatus 200. Information on the keyword may be transferred in the plaintext or transmitted in the homomorphic encryption.

In case of receiving the keyword information, the first server apparatus 200 may generate the lookup table information based on the information. The lookup table information is described in detail with reference to FIGS. 7 and 8.

Alternatively, the second server apparatus 300 may be operated as the cloud server storing the plurality of encryptions, and the first server apparatus 200 may be operated as an apparatus responding to a requested query. For example, one of the plurality of electronic apparatus may request a query to retrieve a specific encryption. In this case, the first server apparatus 200 may generate response information corresponding to the query and provide the same to the electronic apparatus 100-1 requesting the query. A specific operation of generating the response information corresponding to this query request is described below with reference to FIG. 10.

Here, the query may indicate requesting to retrieve desired information from a database, or the like. The query may be referred to as a question, a question word, an enquiry, an inquiry, or the like. The query may include only the keyword for the above-mentioned query or the like, or may include a combination of the keyword and a code.

Meanwhile, the query in the present disclosure may use a query in the plaintext as well as the query in the encryption. Here, the query in the encryption may be the homomorphic encryption. Meanwhile, the query may be the numeric data. In this case, the query may be homomorphically encrypted without any separate conversion. However, the query may be the unstructured data rather than the numeric data, for example, a text. In this case, the electronic apparatus 100-1 may vectorize the query (for example, a text keyword) to be retrieved, and homomorphically encrypt a vectorized value.

Here, vectorizing the unstructured data is described below with reference to FIG. 9. Hereinabove, the description provides an example of converting the unstructured data to the numeric data by vectorizing the same. However, in implementation, the electronic apparatus may also map the text to a specific value in a 1:1 relationship and convert a specific word to its corresponding numeric value in addition to the vectorizing method.

Through the above-described process, the electronic apparatus 100-1 that received the response may decrypt the received response, and secure an index for the homomorphic encryption corresponding to the query. For example, the electronic apparatus 100-1 may decrypt the received response information by using the secret key to thus acquire the index.

In implementation, there may be no keyword corresponding to query information, that is, there may be no retrieval result corresponding to the query. In this case the index may not be included in the received response.

In case of acquiring the index, the electronic apparatus 100-1 may acquire the homomorphic encryption by using the secured index. For example, the homomorphic code may be stored in the first server apparatus 200. In this case, the electronic apparatus 100-1 may transmit the index to the first server apparatus 200 to thus acquire the homomorphic encryption corresponding to the index from the first server apparatus 200.

Alternatively, the homomorphic code may be stored in the second server apparatus 300. In this case, the electronic apparatus 100-1 may transmit the index to the second server apparatus 300 to thus acquire the homomorphic encryption corresponding to the index from the second server apparatus 300. In implementation, the apparatus performing the response to the query and the apparatus storing the homomorphic encryption may be implemented as one apparatus, or may be implemented in separate forms.

As described above, the network system according to this embodiment may provide high security because user data is homomorphically encrypted and then stored in the server. In addition, the network system may provide security much higher than before in that an operation of retrieving the stored data may also be performed in the encrypted state by the server apparatus, thus requiring no decryption of the homomorphic encryption in a query process or a query retrieval process.

In addition, the network system may provide a faster retrieval by using the lookup table information where the keyword and the index are mapped to each other to thus perform retrieval considering the feature of the homomorphic encryption, that is, retrieval utilizing parallelism of homomorphic calculation, in the retrieval process.

Figure 2:
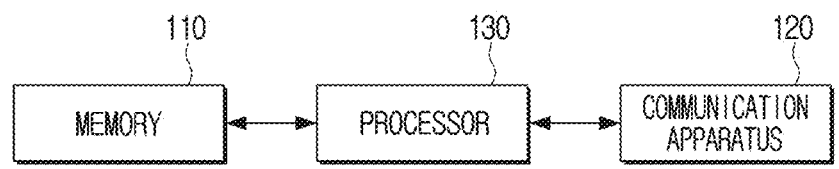
FIG. 2 is a block diagram showing a brief configuration of an electronic apparatus according to an embodiment of the present disclosure.

FIG. 2 is a block diagram showing a brief configuration of the electronic apparatus according to an embodiment of the present disclosure.

The electronic apparatus 100 of FIG. 2 may be operated as the electronic apparatus of FIG. 1 or as the server apparatus of FIG. 1. That is, the electronic apparatus of FIG. 2 may be operated not only as the apparatus generating the query, but also as the apparatus retrieving the homomorphic encryption based the received query.

Referring to FIG. 2, the electronic apparatus 100 may include a memory 110, a communication apparatus 120, and a processor 130.

The memory 110 may be a component for storing various instructions and/or software, data, or the like related to an operating system (O/S) for driving the electronic apparatus 100 or the generation and calculation processing of the homomorphic encryption described below. The memory 110 may be implemented in various forms such as a random access memory (RAM), read-only memory (ROM), a flash memory, a hard disk drive (HDD), an external memory, or a memory card, and is not limited to any one of these forms.

The memory 110 may store the message to be encrypted. Here, the message may be various credit information, personal information, or the like cited by the user in various ways, and may also be information on a usage history, such as location information, internet usage time information, or the like, used by the electronic apparatus 100.

In addition, the memory 110 may store the public key, and store not only the secret key but also various parameters necessary for generating the public key and the secret key in case that the electronic apparatus 100 is an apparatus directly generating the public key.

In addition, the memory 110 may store the homomorphic encryption generated in a process described below. Alternatively, the memory 110 may store the homomorphic encryption generated by and received from another apparatus.

Meanwhile, the electronic apparatus may be operated as the server of FIG. 1. In this case, the memory 110 may store the homomorphic encryption received from the external apparatus. In this case, the memory 110 may also store the lookup table information. The lookup table information may be data acquired by homomorphically encrypting the keyword information and the index information that respectively correspond to the plurality of homomorphic encryptions. This configuration is described below.

The communication apparatus 120 may connect the electronic apparatus 100 to the external apparatus (not shown), and may be connected to the external apparatus not only through a local area network (LAN) or an Internet network, or but also through a universal serial bus (USB) port or a wireless communication (e.g., wireless fidelity (Wi-Fi) 802.11a/b/g/n, near field communication (NFC), or Bluetooth) port. The communication apparatus 120 may also be referred to as a transceiver.

The communication apparatus 120 may receive the public key from the external apparatus and transmit the public key generated by the electronic apparatus 100 to the external apparatus.

In addition, the communication apparatus 120 may receive the message from the external apparatus, and transmit the generated homomorphic encryption to the external apparatus. Here, the communication apparatus 120 may transmit the keyword for the homomorphic encryption together to the external apparatus. Here, the keyword may be transmitted in the plaintext or may be transmitted in the homomorphic encryption. For example, the above-mentioned keyword may be an address, a global positioning system (GPS) location, or the like in case that the homomorphic encryption is user location information.

In addition, the communication apparatus 120 may receive the various parameters required to generate the encryption from the external electronic apparatus. Meanwhile, in implementation, the various parameters may be input directly from the user through a manipulation input apparatus 150 described below.

In case of performing the function of the electronic apparatus of FIG. 1, the communication apparatus 120 may transmit the query information to the external apparatus, and receive the retrieval result information from the external apparatus. In addition, the communication apparatus 120 may transmit the index information corresponding to the homomorphic encryption to the external apparatus, and receive the homomorphic encryption in response.

Meanwhile, in case of performing the function of the server of FIG. 1, the communication apparatus 120 may receive the homomorphic encryption and the keyword information of the homomorphic encryption. In addition, the communication apparatus 120 may receive the query information, and transmit the retrieval result information corresponding to the received query information to the apparatus requesting the query information. Here, the retrieval result information may be homomorphically encrypted encryption.

Here, the retrieval result information may be referred to as homomorphically encrypted index information described below or may be referred to as the retrieval result information, an encrypted retrieval result, or the like.

The processor 130 may control each component in the electronic apparatus 100. The processor 130 may include one apparatus such as a central processing unit (CPU) or an application-specific integrated circuit (ASIC), or may include a plurality of apparatuses such as the CPU and a graphics processing unit (GPU).

In case of receiving the message to be transmitted, the processor 130 may store the same in the memory 110. The processor 130 may homomorphically encrypt the message by using various set values and programs stored in the memory 110. In this case, the processor 130 may use the public key (or a symmetric key).

The processor 130 may generate and use the public key necessary to perform the encryption on its own, or receive the public key from the external electronic apparatus and use the same. As an example, the second server apparatus 300 performing the decryption may distribute the public key to other apparatuses.

In case of generating the key on its own, the processor 130 may generate the public key by using a ring-LWE scheme. In detail, the processor 130 may first set the various parameters and rings, and store the same in the memory 110. An example of the parameter may include the bit length, dimension n, or rank k of the plaintext message, sizes of the public key and the secret key, or the like. The homomorphic encryption may have various formats, and the processor 130 may set the ring based on an encryption method based on a method set by the user or a predetermined method. For example, the homomorphic encryption method described above may be a Cheon-Kim-Kim-Song (CKKS) scheme, a ring learning with errors (RLWE) scheme, or the like.

The ring may be expressed as the following equation.

$$R = Z_q[X]/f(x) \qquad [\text{Equation 2}]$$

Here, R indicates the ring, Zq indicates a coefficient, and f(x) indicates an N-th polynomial.

The Ring indicates a set of polynomials having predetermined coefficients, and indicates the set in which addition and multiplication are defined between elements and are closed for the addition and the multiplication. The Ring may be referred to as the ring.

As an example, the ring indicates a set of the N-th polynomials with the coefficient Zq. In detail, in case that n is $\Phi(N)$, the polynomial indicates a polynomial which may be computed as the remainder of dividing the polynomial by an N-th cyclotomic polynomial. f(x) indicates ideal of Zq[x] generated by f(x). The Euler totient function $\Phi(N)$ indicates the number of natural numbers that are prime to N and smaller than N. If $\Phi N(x)$ is defined as the n-th cyclotomic polynomial, the ring may also be expressed in Equation 3 as follows.

$$R = Z_q[X]/\Phi_N(x) \qquad [\text{Equation 3}]$$

In case that the ring is set, the processor 130 may compute the secret key sk from the ring.

$$sk \leftarrow (1, s(x)), s(x) \in R \qquad [\text{Equation 4}]$$

Here, s(x) indicates a random polynomial generated using a small coefficient.

In case that the ring and the secret key are selected, the processor 130 may compute a first random polynomial a(x) from the ring. The first random polynomial may be expressed as follows.

$$a(x) \leftarrow R \qquad [\text{Equation 5}]$$

In addition, the processor 130 may compute the error. In detail, the processor 130 may extract the error from a discrete Gaussian distribution or a distribution having a statistical distance close thereto. This error may be expressed as follows.

$$e(x) \leftarrow D_{n\alpha q} \qquad \text{[Equation 6]}$$

In case that even the error is computed, the processor 130 may compute a second random polynomial by modularly calculating the error on the first random polynomial and the secret key. The second random polynomial may be expressed as follows.

$$b(x) = -a(x)s(x) + e(x) (\mathrm{mod}\ q) \qquad \text{[Equation 7]}$$

Finally, the public key pk may be set to include the first random polynomial and the second random polynomial as follows.

$$\mathrm{pk} = (b(x), a(x)) \qquad \text{[Equation 8]}$$

The method of generating the key described above is only an example, the present disclosure is not necessarily limited thereto, and the public key and the secret key may be generated by another method.

In addition, in implementation, the processor 130 may generate the key by using a symmetric key method rather than a public key method, and use the encryption or decryption method of the symmetric key method.

In addition, the processor 130 may generate the homomorphic encryption for the message. In detail, the processor 130 may generate the homomorphic encryption by applying the public key previously generated to the message. Here, the processor 130 may generate a length of the encryption to correspond to a size of the scaling factor.

In addition, the processor 130 may store the homomorphic encryption in the memory 110 in case that the homomorphic encryption is generated, or control the communication apparatus 120 to transmit the homomorphic encryption to another apparatus based on the user request or a predetermined default command.

Meanwhile, according to an embodiment of the present disclosure, packing may be used. The plurality of messages may be encrypted into one encryption in case that the packing is used in the homomorphic encryption. In this case, the electronic apparatus 100 may perform the calculation between the respective encryptions. Here, as a result, the calculation for the plurality of messages may be processed in parallel, thereby greatly reducing a calculation burden.

For example, the lookup table information may have the keyword and the index information for each of the plurality of homomorphic encryptions by applying the above-described packing method.

The message may include a plurality of message vectors. In this case, the processor 130 may convert the plurality of message vectors to a polynomial which may encrypt the message vectors in parallel, then multiply the polynomial by the scaling factor, and perform the homomorphic encryption by using the public key. Accordingly, the processor may generate the encryption where the plurality of message vectors are packed.

In addition, the decoding may be required for the homomorphic encryption. In this case, the processor 130 may apply the secret key to the homomorphic encryption to thus generate a decrypted text in the polynomial, and generate the message by decoding the decrypted text in the polynomial. Here, the generated message may include the error as mentioned in Equation 1 described above.

In addition, the processor 130 may perform the calculation on the encryption. In this case, the processor 130 may perform the calculation such as the addition or the multiplication on the homomorphic encryption while maintaining its encrypted state. In detail, the processor 130 may perform a first function processing on each of the homomorphic encryptions to be used in the calculation, perform the calculation such as the addition, the multiplication, or the like between the homomorphic encryptions where the first function processing is performed, and perform a second function that is an inverse function of the first function on the homomorphic encryption where the calculation is performed. These first function processing and second function processing may use linear transformation technology of a reboot process described below.

Meanwhile, the processor 130 may convert the homomorphic encryption. For example, various forms of the homomorphic encryptions may exist. In this case, the homomorphic encryptions may have different dimensions or different ranks. Therefore, the processor is unable to perform these calculations together. Therefore, the processor 130 may convert the input homomorphic encryption or the homomorphic encryption to be calculated to an N-dimensional RLWE, a K-rank RLWE, or an N-dimensional K-rank RLWE for the processor to cover all the dimensions and ranks, and perform the calculation processing by using converted encryption. This operation may be referred to as encryption linear conversion and key switching to a multi-secret RLWE.

Meanwhile, in case that the calculation is completed, the processor 130 may detect data of an effective region from calculation result data. In detail, the processor 130 may detect the data of the effective region by performing a rounding processing on the calculation result data. The rounding process may refer to rounding off the message in the encrypted state, and may also be referred to as rescaling.

In detail, the processor 130 may remove a noise region by multiplying each component of the encryption by $\Delta\text{-}1$, which is a reciprocal of the scaling factor, and rounding the same. The noise region may be determined to correspond to the size of the scaling factor. As a result, the processor may detect the message of the effective region excluding the noise region. An additional error may occur because the process is performed in the encryption state. However, this error may be ignored because its size is sufficiently small.

In addition, the processor 130 may perform a reboot operation on the encryption in case that a proportion of an approximate message in the calculation result encryption is more than a threshold. In detail, the processor 130 may extend the modulus of the calculation result encryption, perform a first linear conversion of the homomorphic encryption having the extended modulus to the polynomial, and perform an approximate calculation on a first homomorphic encryption converted to the polynomial by using a function set to approximate a modulated range of the plaintext.

In addition, the processor 130 may perform a second linear conversion on a second homomorphic encryption, where the approximate calculation is performed, to the homomorphic encryption, and perform subtraction calculation of the second homomorphic encryption, where the second linear conversion is performed, from the homomorphic encryption having the extended modulus, to thus generate the homomorphic encryption having an extended plaintext space.

Meanwhile, the description hereinabove describes the general encryption and decryption methods by the electronic apparatus 100, and accordingly, the description hereinafter describes the query request and a retrieval operation in detail.

First, the description describes an operation of the electronic apparatus in case of being operated as the client.

The processor 130 may extract the keyword for the homomorphic encryption in case of transmitting the homomorphic encryption to the external apparatus, and control the communication apparatus 120 to transmit the extracted keyword and the homomorphic encryption to the external apparatus. Such a keyword may be used in the query retrieval process described below, and generated in accordance with a predetermined query rule. This configuration is described below with reference to FIG. 8.

The processor 130 may generate the query information. Here, the processor 130 may convert a text to the numeric data in case of using an unstructured text such as the text, and homomorphically encrypt the numeric data to thus generate homomorphically encrypted query information. Here, the processor 130 may use a bidirectional encoder representations from transformers (BERT) language model converting text data to the numeric data. This configuration is described below with reference to FIG. 9.

Meanwhile, in implementation, the processor 130 may also transmit the query information in the plaintext or the text as it is to the external apparatus without converting the query information to the homomorphic encryption. That is, in implementation, the conversion to the vector value described above and the conversion to the homomorphic encryption may also be performed by an apparatus performing a comparison operation for the query.

In case that the query information is generated, the processor 130 may control the communication apparatus 120 to transmit the generated query information to the external apparatus.

In addition, in case of receiving the response information corresponding thereto, the processor 130 may decrypt the received response information to thus acquire the index information. For example, the processor 130 may decrypt the received response information by using the secret key to thus acquire the index information.

In addition, the processor 130 may control the communication apparatus 120 to transmit the index information to the external apparatus. In response, the processor 130 may receive the homomorphic encryption corresponding to the index information from the external apparatus, and perform the decryption operation on the received homomorphic encryption to thus acquire data corresponding to the query.

Hereinafter, the description describes an operation of the processor 130 in case of being operated as the server receiving the request.

The processor 130 may generate or update the lookup table information. In detail, the processor 130 may assign the index for the homomorphic encryption in case of receiving a new homomorphic encryption and a keyword for the homomorphic encryption. Here, the index may be a value sequentially assigned based on a reception order of the homomorphic encryption, and may be assigned based on the storage location and predetermined classification criteria of the homomorphic encryption.

Here, the processor 130 may generate a separate lookup data having the index and the storage location of the homomorphic encryption, and store the same in the memory 110.

In addition, the processor 130 may homomorphically encrypt each of the index and the keyword, and generate the lookup table by using the homomorphic encryption for each of the index and the keyword, or update the lookup table by adding a content to the existing lookup table. Meanwhile, the processor 130 may omit an additional encryption operation in case of receiving the keyword in the homomorphically encrypted state.

In case of receiving the query information, the processor 130 may generate the index information by using the received query information and lookup table information. Such query information may be an unstructured encryption. That is, the query information may be the text (or the keyword). Alternatively, the query information may be information converted to the vector value as described above in the lookup table, or acquired by homomorphically encrypting the vector value.

In case of receiving the query information including the unstructured data, the processor 130 may further perform an operation of converting the unstructured data included in the query information to the vector value and an operation of homomorphically encrypting the vector value.

The processor 130 may retrieve the homomorphically encrypted index information by using the received query information (here, the homomorphically encrypted data) and the lookup table information. For example, the processor 130 may perform a homomorphic comparison operation on the query information and the keyword information to generate an empty mask indicating whether the index information is masked. Here, the empty mask may be used for masking specific information, and may be a mask ensuring a value of a column of another information to be masked, that is, to be zero in case that a value in the empty mask is zero, and the value of the column of another information to be maintained in case that the value in the empty mask is 1.

In addition, the processor 130 may generate an index homomorphic encryption by performing homomorphic calculation on the empty mask and the lookup table information. In detail, the processor 130 may generate the index homomorphic encryption by performing homomorphic multiplication calculation on the empty mask and the index information, and using the index information calculated by the multiplication.

In addition, the processor 130 may control the communication apparatus 120 to transmit the index homomorphic encryption. Meanwhile, in case of directly storing the homomorphic encryption, the processor 130 may retrieve the homomorphic encryption based on the index information in the plaintext that is transferred from the external apparatus, and transmit the retrieved homomorphic encryption to the external apparatus.

Meanwhile, in implementation, the lookup table and the homomorphic encryption may be stored in separate apparatuses. That is, the first server apparatus 200 of FIG. 1 may store the lookup table, and the second server apparatus 300 may store the homomorphic encryption. In addition, the plurality of homomorphic encryptions may be stored in the plurality of server apparatuses. In this case, the index information may include information for distinguishing a storage for the homomorphic encryption.

For example, the homomorphic encryptions having index numbers from 1 to 100 may be stored in the first server apparatus, and the homomorphic encryptions having index numbers from 101 to 200 may be stored in the second server apparatus. In this environment, each server apparatus or each electronic apparatus may pre-share information on a storage for each index.

The electronic apparatus 100 according to the present disclosure may retrieve the plurality of homomorphic encryptions by using the lookup table, thus performing the faster retrieval of the homomorphic encryption corresponding to a specific keyword.

Meanwhile, hereinabove, the description shows and describes only the brief configuration of the electronic apparatus 100. However, in implementation, various configurations may be further provided. This configuration is described below with reference to FIG. 3.

Figure 3:
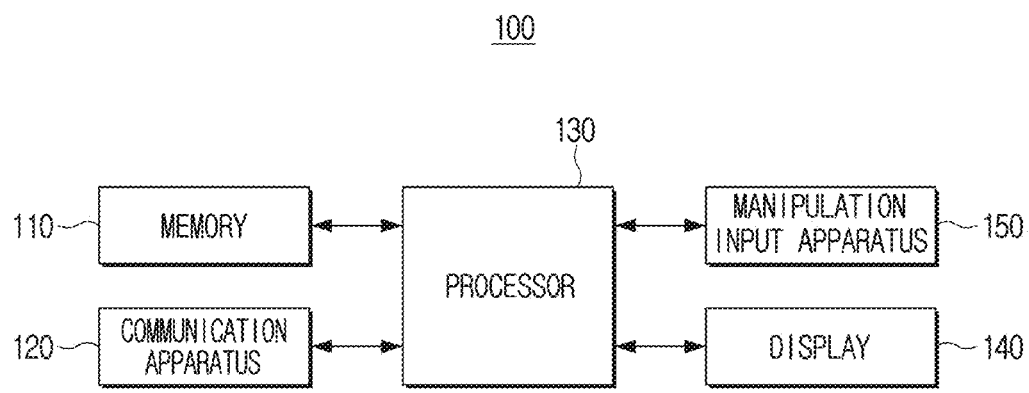
FIG. 3 is a block diagram showing a specific configuration of the electronic apparatus according to an embodiment of the present disclosure.

FIG. 3 is a block diagram showing a specific configuration of the electronic apparatus according to an embodiment of the present disclosure.

Referring to FIG. 3, the electronic apparatus 100 of the present disclosure may include the memory 110, the communication apparatus 120, the processor 130, a display 140, and the manipulation input apparatus 150.

The memory 110 and the communication apparatus 120 are already described with reference to FIG. 2, and redundant descriptions thereof are omitted. In addition, the processor 130 is also already described with reference to FIG. 2, and the description thus omits a redundant description thereof provided with reference to FIG. 2, and describes below only an added component in FIG. 3.

The display 140 may display a user interface window for selection of a function supported by the electronic apparatus 100. In detail, the display 140 may display the user interface window for selection of various functions provided by the electronic apparatus 100. The display 140 may be a monitor such as a liquid crystal display (LCD), a cathode ray tube (CRT), or an organic light-emitting diode (OLED), and may be implemented as a touch screen which may simultaneously perform functions of the manipulation input apparatus 150 described below.

The display 140 may display a message requesting an input of the parameter required to generate the secret key or the public key. In addition, the display 140 may display a message where an encryption target selects the message. Meanwhile, in implementation, the encryption target may be directly selected by the user or automatically selected. That is, personal information that requires the encryption may be automatically set even though the user does not directly select the message.

In addition, the display 140 may display a user interface (UI) to receive the keyword to be included in the query information, that is, the various queries related to the retrieval. In addition, the display 140 may display the retrieval result in response to the input query.

The manipulation input apparatus 150 may receive, from the user, selection of a function of the electronic apparatus 100 and a control command for the function. In detail, the manipulation input apparatus 150 may receive, from the user, the parameter required to generate the secret key or the public key. In addition, the manipulation input apparatus 150 may receive the message set to be encrypted from the user.

In case of being operated as the electronic apparatus of FIG. 1, the manipulation input apparatus 150 may receive, from the user, the keyword, the text, or the like, included in the query information.

The processor 130 may generate a set parameter based on the received parameter in case of receiving, from the user, the parameter required to generate the secret key or the public key, and generate the secret key or the public key based on the generated set parameter.

In addition, if it is necessary to generate the encryption for the message, the processor 130 may generate the homomorphic encryption by applying the public key to the message. In detail, the processor 130 may convert the message to the polynomial and apply the public key to the message converted to the polynomial to thus generate the homomorphic encryption.

Here, the processor 130 may generate the keyword for the message, or determine the keyword input from the user as the keyword for the generated homomorphic encryption. Here, in case of transmitting the homomorphic encryption to the external apparatus, the processor 130 may transmit the keyword together. Here, the keyword may be transmitted in the plaintext, or transmitted in the homomorphic encryption.

In addition, the decoding may be required for the homomorphic encryption. In this case, the processor 130 may apply the secret key to the homomorphic encryption to thus generate the decrypted text in the polynomial, and decode the decrypted text in the polynomial to thus generate the message. Here, the generated message may include the error as mentioned in Equation 1 described above.

Figure 4:
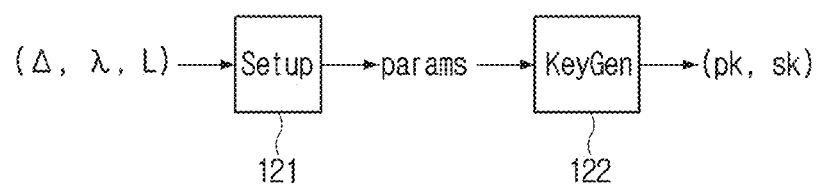
FIG. 4 is a view for explaining a generation operation of a public key or a secret key.

FIG. 4 is a view for explaining a generation operation of the public key and the secret key.

Referring to FIG. 4, a setup module 121 may receive, from the user, the scaling factor $\Delta$, a security parameter $\lambda$, and a level parameter L. Here, the scaling factor $\Delta$ is a parameter for controlling a size of the message and may be greater than 1. In addition, the security parameter $\lambda$ is an indicator of how stable a scheme is and may be referred to as estimation complexity. In addition, the level parameter is an indicator of a depth for supporting the calculation.

The setup module 121 receiving the parameter described above may set the moduli, randomly select an integer n and a positive number P, and output the set parameter such as $n, (q_i)_{1 \leq i \leq i_s}, P, \Delta)$.

A key generation module 122 may receive the set parameter previously generated by the set module 121, and generate the secret key and public key based on the received set parameter.

In detail, the key generation module 122 may compute the secret key and the error.

In addition, the key generation module 122 may generate a first random polynomial and a second random polynomial.

In addition, the key generation module 122 may generate the public key and the secret key by using the generated parameter, the first random polynomial, and the second random polynomial.

Figure 5:
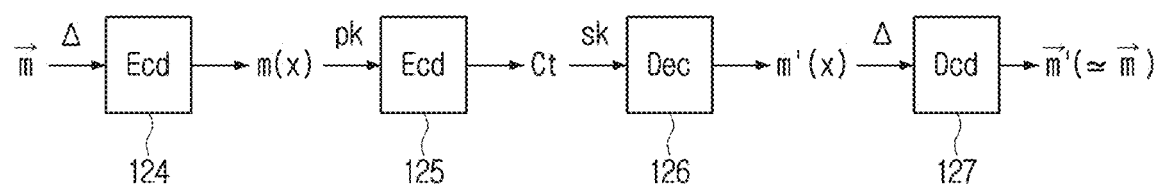
FIG. 5 is a view for explaining the generation and decoding operations of an approximate homomorphic encryption.

FIG. 5 is a view for explaining the generation and decoding operations of an approximate homomorphic encryption.

Referring to FIG. 5, an encoding module 124 may receive the message and the scaling factor, and reflect the scaling factor to the message, thereby converting the same to the polynomial.

In detail, in case of receiving $\vec{m}=(m_j)_{0 \leq j < n/2} \in \mathbb{R}^{n/2}$ and a scaling factor of 1 or more, the encoding module 124 may output the message in a polynomial as shown in Equation 9 below.

$$m(X) = \tau^{-1}\left(\lfloor \Delta \cdot \vec{m} \rfloor_{\tau(R')}\right) \in R' \qquad \text{[Equation 9]}$$

Here m(x) is the message in the polynomial. This type of conversion may be referred to as the linear conversion.

In addition, an encryption module 125 may receive the message in the polynomial and reflect the public key to the received message, thereby generating the homomorphic encryption. In detail, the encryption module 125 may generate the homomorphic encryption by using Equation 10 below.

$$v \cdot pk + (m + e_0, r_1)(\text{mod } q_L) \qquad \text{[Equation 10]}$$

Here, v indicates a selected element, and e0 and e1 indicate selected error values.

A decryption module 126 may receive the encryption and the secret key, and decrypt the encryption, thereby outputting the message including the error. In detail, the decryption module 126 may output the message such as $m' = c_0 + c_1 \cdot s$ (mod $q_c$) in case that the input encryption is $ct = (c_0, c_1) \in R'^2_q$. For example, the decryption module 126 may output the message such as $\vec{m} = (m_j = \Delta^{-1} m(C_j))_{0 \leq j < n/2} \in \mathbb{R}^{n/2}$ in case that the message in the polynomial satisfies m(X)∈R'.

Meanwhile, the message output from the decryption module 126 may be the message in the polynomial. Therefore, a decoding module 127 may finally output the message based on the message output from the decryption module 126 and the scaling factor.

Figure 6:
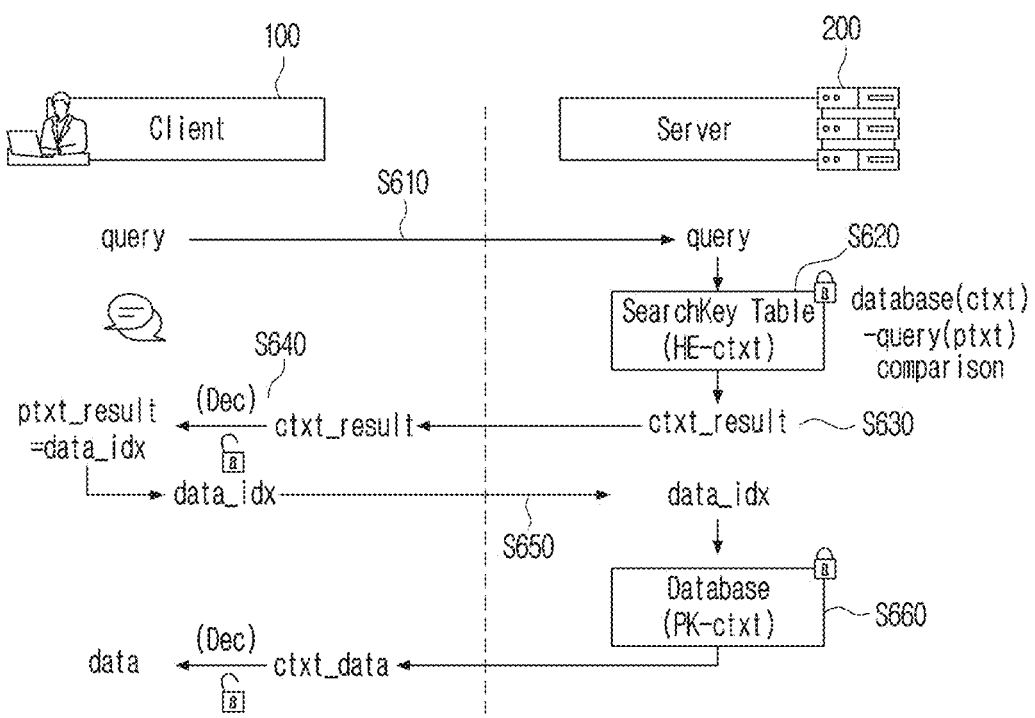
FIG. 6 is a view for explaining a retrieval operation according to an embodiment of the present disclosure.

FIG. 6 is a view for explaining a retrieval operation according to an embodiment of the present disclosure.

Referring to FIG. 6, a retrieval system may include the client and the server. Here, the client may be the electronic apparatus 100 of FIG. 1, and the server may be the first server apparatus 200 of FIG. 1.

The client may generate the query and transmit the generated query to the server (S610). Here, the query may be the data in the plaintext or the homomorphically encrypted data.

Meanwhile, the query may be the unstructured data such as the text. In this case, the client may convert the unstructured data to the numeric data. This conversion to the numeric data may use an algorithm of FIG. 9 described below. Meanwhile, in implementation, the conversion may use various algorithms other than the above-described algorithm.

In case that the query is transmitted to the server, the server may compare the received query information with the pre-stored lookup table information (S620). A specific comparison operation is described below with reference to FIG. 10.

Here, the lookup table information may be generated based on the homomorphic encryption stored by the server, and a generation operation of the lookup table is described below with reference to FIGS. 7 and 8.

The server may generate the homomorphically encrypted index information as a result of the above-described operation (S630). In addition, the server may transmit the generated index information to the client 100.

The client may check the index by decrypting the provided index information (S640). The client may transfer the index to the server (S650), and receive, from the server, the homomorphic encryption corresponding to the index.

In addition, the client may acquire the data corresponding to the query by decrypting the homomorphic encryption (S660).

Meanwhile, the description hereinabove shows that the server performs both the data retrieval and the data storage. However, in implementation, the retrieval and the storage may be performed by separate apparatuses. In this case, the client may acquire the homomorphic encryption by requesting the index described above from another apparatus storing the homomorphic encryption rather than the server.

Meanwhile, in showing and describing FIG. 6, user authentication or verification operation is neither included nor described in the above-described process. However, in implementation, the server may perform the user authentication and/or verification operation on the received query information and/or index information.

Figure 7:
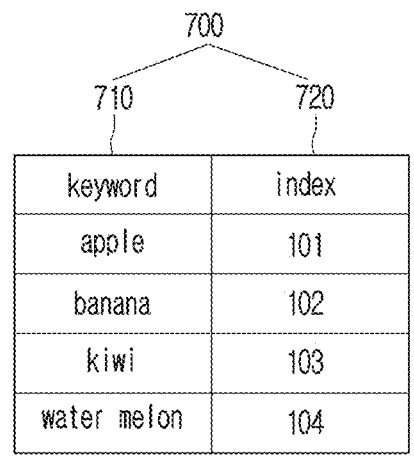
FIG. 7 is a view showing an example of a lookup table according to an embodiment of the present disclosure.

FIG. 7 is a view showing an example of the lookup table according to an embodiment of the present disclosure.

Referring to FIG. 7, lookup table information 700 may include a keyword region 710 and an index region 720. In the illustrated example, information in each region is shown in the plaintext. However, this example is provided only for the description, and the information in the lookup table may actually be the homomorphically encrypted data on a content shown in the plaintext.

The keyword region 710 may include the keyword corresponding to the specific encryption. Such a keyword may be a keyword input directly by the user for the encryption, or a keyword automatically extracted in a homomorphic encryption process for corresponding data. The keyword may be the text as shown in the drawing, and may also be the numeric data.

In addition, in addition to the text, the unstructured data such as an image may be used as the keyword. In addition, the keyword described above may have a value corresponding to the feature, type, or attribute of the data. For example, the keyword described above may be the address or the global positioning system (GPS) location in case that the location information is homomorphically encrypted.

The index region 720 may store the index assigned to the homomorphic encryption corresponding to the keyword. The index is a value assigned by the server, and may be a value assigned sequentially based on an order of the input data, or may be assigned based on the classification criteria pre-established based on the storage location, a file type, or the like.

In addition, although the illustrated example shows that the keyword and the index are stored in the lookup table, the lookup table information described above may be one homomorphic encryption. That is, as described above, the homomorphic encryption may be provided by packing the plurality of data into one. Therefore, the keyword information corresponding to each row (that is, the keyword) and the index information corresponding thereto may be packed into one homomorphic encryption.

In addition, the keyword information and the index information may be disposed in different slots for the retrieval in the homomorphic encryption. In addition, the keyword information corresponding to each keyword may be identically disposed in a first slot, and the index information may also be identically disposed in a second slot.

In addition, the illustrated example shows that only one keyword is registered and used for one homomorphic encryption. However, two or more keywords may be used in implementation. This configuration is described below with reference to FIG. 8.

Figure 8:
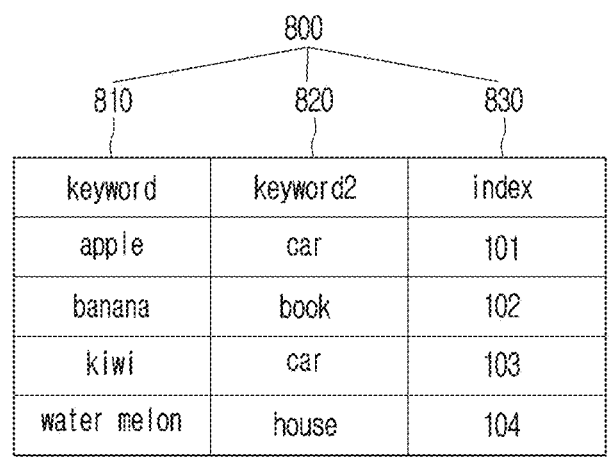
FIG. 8 is a view showing another example of the lookup table according to an embodiment of the present disclosure.

FIG. 8 is a view showing another example of the lookup table according to an embodiment of the present disclosure.

Referring to FIG. 8, lookup table information 800 may include a first keyword region 810, a second keyword region 820, and an index region 830.

Each of the first keyword region 810 and the second keyword region 820 may have the keyword information corresponding to the specific encryption. A content of each keyword is the same as that described with reference to FIG. 7, and the description thus omits its redundant description.

Meanwhile, the illustrated example shows that the two keyword regions 810 and 820 are used for the homomorphic encryption. However, in implementation, three or more keyword regions may be used.

In addition, the illustrated example shows that all items include information on the two keywords. However, in implementation, the keyword may be included in only some of the two regions. For example, one keyword may be used for some homomorphic encryptions, and two keyword information may be used for other homomorphic encryptions.

However, the keyword region and the index region may be disposed in different slots in the lookup table information to prevent the keyword region 810 or 820 and the index region 830 from being interchangeably used. For example, one keyword may be stored for a first homomorphic encryption, and two keywords may be stored for a second homomorphic encryption. In this case, one keyword may be stored in the first keyword region (or a first slot) of the first the homomorphic encryption, and zero or no data may be stored in the second keyword region (or a second slot). In addition, the index information may be stored in the index region 830 (or a third slot).

On the contrary, in the second homomorphic encryption, the keyword corresponding to each of the first and second slots may be stored, and the index information may be stored in the third slot.

Meanwhile, the illustrated example shows and describes that the first keyword region 810 and the second keyword region 820 are as regions for simply storing the received keywords. However, different functions (or regions) may be used for the respective keyword regions.

For example, a keyword related to a language may be stored in the first keyword region 810, and a keyword related to a topic may be stored in the second keyword region 820. That is, the keyword related to the language such as "English" or "Korean" may be stored in the first keyword region. In this way, the specific attribute and type may be distinguished for each keyword region.

Therefore, in case that the client also knows such classification, the processor may generate the query information in response. That is, the first keyword region may have "Hangul", the second keyword region may have "car", and the processor may generate the query information having a code (e.g., and) corresponding to a relationship between the two keywords and provide the same to the server.

In this way, in case that the query information such as "Hangul"* "car" is transmitted to the server, the processor may generate a first mask matching "Hangul" among the first keyword information, generate a second mask matching "car" among the second keyword information, add the first mask and the second mask to generate a third mask having a value of 1 in case that any of the information in the two masks is 1, and also generate a final index by using the third mask.

Meanwhile, in case that the query information such as "Hangul" & "car" is transmitted to the server, the processor may generate the first mask matching "Hangul" among the first keyword information, generate the second mask matching "car" among the second keyword information, multiply the first mask and the second mask to generate a fourth mask having a value of 1 on in case that the information in the two masks is 1, and also generate the final index by using the fourth mask.

Figure 9:
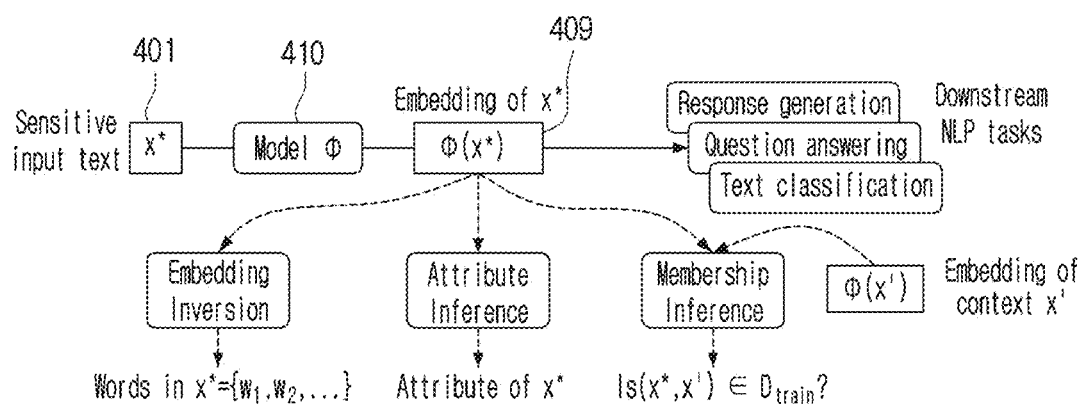
FIG. 9 is a view for explaining a conversion operation of unstructured data in the present disclosure into numeric data.

FIG. 9 is a view for explaining a conversion operation of the unstructured data in the present disclosure into the numeric data.

Referring to FIG. 9, shown is the BERT language model converting the text data to the numeric data.

The BERT model is a model performing embedding conversion of received string data to the numeric data. This model may convert one text sentence to one vector having a length of 768 or an array of 768× token numbers. The numeric data generated here may be a 32-bit real number in a floating point format between [−1, 1]. This model may check a word index (or a numerical value) corresponding to each of a plurality of words included in one sentence, use a plurality of word index values as input values of the model, and compute the vector value as described above as a result.

In this way, despite computing the vector value including only the numbers, the BERT may recover an original text based on the vector value. Reflecting this point, in the present disclosure, the text data may be classified into sentences, the vector value described above may be encrypted for each separated sentence, and the homomorphic encryption may then be performed on the string data.

Meanwhile, the illustrated example shows that only the string data is vectorized. However, it is also possible to quantify the unstructured data such as the image and perform the homomorphic encryption.

Figure 10:
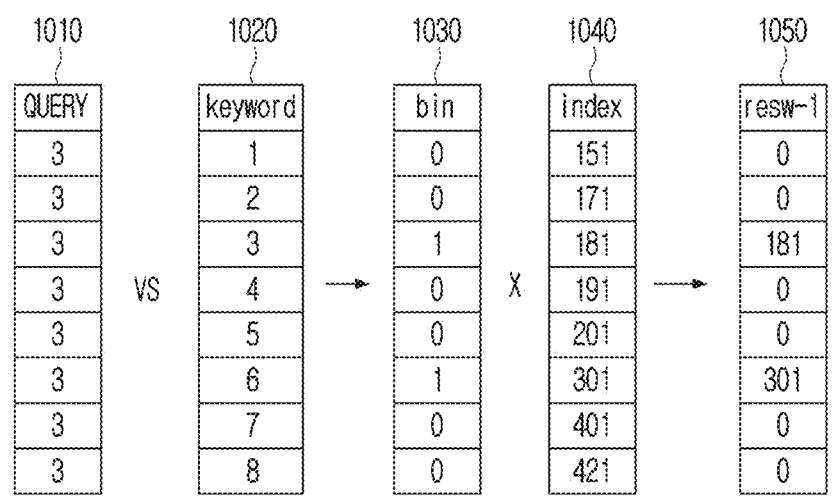
FIG. 10 is a view for explaining the retrieval operation using the lookup table according to an embodiment of the present disclosure.

FIG. 10 is a view for explaining the retrieval operation using the lookup table according to an embodiment of the present disclosure.

Referring to FIG. 10, the processor may generate a query mask 1010 corresponding to the query information in case of receiving the query information. For example, as shown in the drawing, the processor may generate the query mask 1010 having the same number of rows as the lookup table information, in which each row has the query information.

The processor may perform homomorphic comparison between the query mask 1010 and a keyword region 1020 in case that the query mask 1010 is generated in this way. In detail, such comparison may be the homomorphic comparison, and the processor may perform the homomorphic comparison, i.e., the comparison operation by using a non-polynomial calculation or an existing known homomorphic comparison algorithm. In this homomorphic comparison, the processor may maintain a value or output a result value of 1 in case that two comparison objects have the same value, or generate a value of zero conversely in case that the two comparison objects have different values.

Meanwhile, the illustrated example shows that values of the third and sixth rows are the same, and it may thus be seen that only the third and sixth rows of a homomorphic calculation result 1030 have the value of 1 and the other rows have the value of zero. Meanwhile, the illustrated example shows values of a calculation process in the plaintext, and a result of each row may thus be easily known. However, it is not known which row has 1 or zero in a data state because the calculation result is actually the homomorphic encryption.

In case of checking the homomorphic calculation result, the processor may perform homomorphic product calculation between the homomorphic calculation result and the index region. Accordingly, the processor may maintain an index value only in case that the homomorphic calculation result is 1, and acquire a calculation result 1050 whose index value is zero in case that the homomorphic calculation result is zero.

In case that the index information is transferred to the client, the client may decrypt the index information and acquire two index information of 181. That is, the client may check that there are two homomorphic encryptions corresponding to a query requested by the client, and request the index to acquire the homomorphic encryption corresponding to the index.

Figure 11:
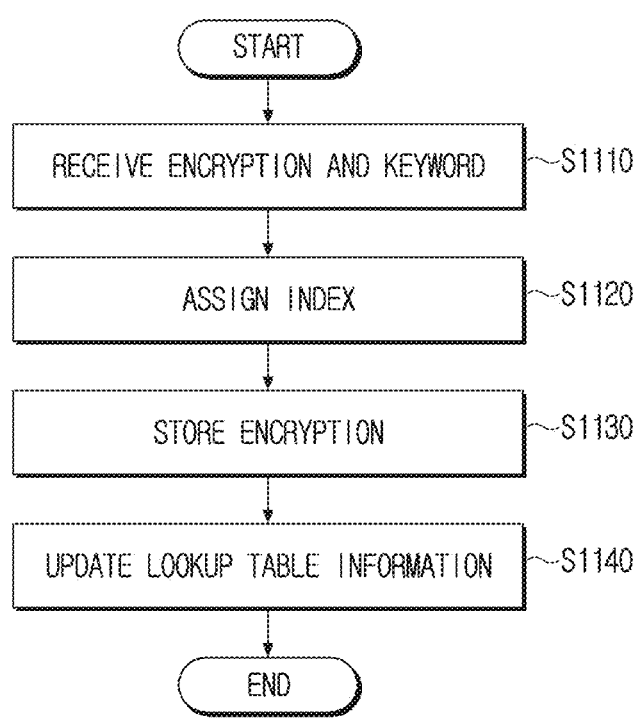
FIG. 11 is a flowchart for explaining the generation operation of the lookup table according to an embodiment of the present disclosure.

FIG. 11 is a flowchart for explaining the generation operation of the lookup table according to an embodiment of the present disclosure.

Referring to FIG. 11, the electronic apparatus (or the server) may receive the new homomorphic encryption and the homomorphically encrypted keyword information for the new homomorphic encryption (S1110).

In addition, the electronic apparatus may generate the index for the new homomorphic encryption (S1120). For example, the indexes may be assigned based on the order of the received homomorphic encryptions, or assigned to correspond to the storage location of the homomorphic encryption. Meanwhile, the electronic apparatus may generate and use a separate lookup table for mapping the storage location and index of the homomorphic encryption to each other.

In addition, the electronic apparatus may store the received new homomorphic encryption (S1130). For example, the electronic apparatus may store the homomorphic encryption at the predetermined storage location. For such storage, not only the storage of the apparatus itself but also the storage of another apparatus may be used.

The electronic apparatus may update the lookup table information based on the index and the keyword information (S1140). In detail, the electronic apparatus may compute the vector value corresponding to the received keyword. A content of computing the vector value for the unstructured data are described above with reference to FIG. 9, and the description omits its redundant description.

In case of computing the vector value in this way, the electronic apparatus may homomorphically encrypt each of the computed vector value and the index.

In addition, the electronic apparatus may update the lookup table by respectively disposing the homomorphically encrypted vector value and index information in the plurality of slots of the above-mentioned lookup table.

Meanwhile, as described above, the plurality of keywords may be provided, and the individual homomorphic encryption and the homomorphically encrypted keyword may respectively be stored in the individual slots in case that the plurality of keywords are used.

Figure 12:
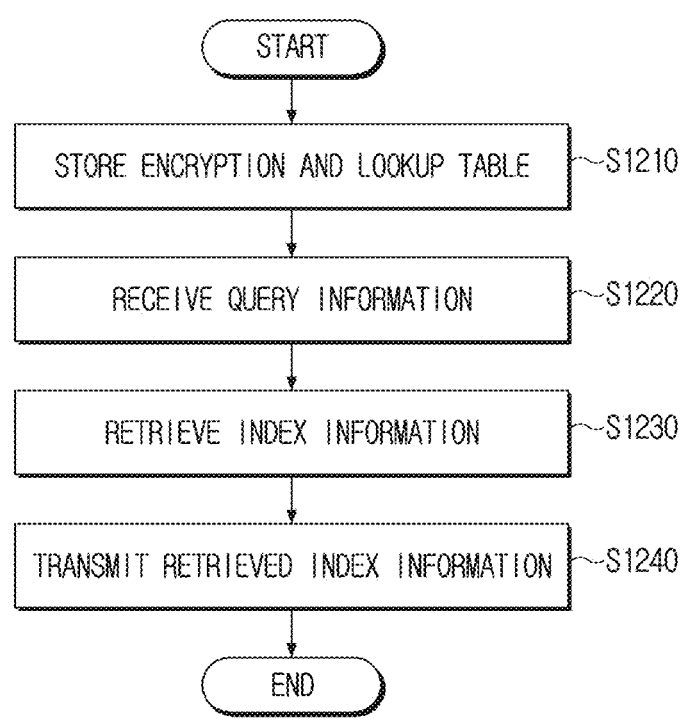
FIG. 12 is a flow chart for explaining a method for processing a homomorphic encryption according to an embodiment of the present disclosure.

FIG. 12 is a flow chart for explaining a method for processing a homomorphic encryption according to an embodiment of the present disclosure.

Referring to FIG. 12, the electronic apparatus (or the server) may store the lookup table (S1210). Here, the lookup table may include the data acquired by homomorphically encrypting the keyword information and the index information that respectively correspond to the plurality of homomorphic encryptions. This configuration is previously described with reference to FIG. 11, and the description thus omits its redundant description.

The electronic apparatus may receive the query information from the external apparatus (S1220). The query information may be the unstructured encryption, that is, the text (or the keyword). Alternatively, the query information may be information converted to the vector value as described above in the lookup table, or acquired by homomorphically encrypting the vector value.

Therefore, in case of receiving the query information as the unstructured data such as the keyword, the electronic apparatus may further perform the operation of converting the keyword included in the query information to the vector value and the operation of homomorphically encrypting the vector value.

The electronic apparatus may retrieve the homomorphically encrypted index information by using the received query information and the lookup table information (S1230). In detail, the electronic apparatus may generate the empty mask indicating whether the index information is masked by performing the homomorphic comparison calculation on the received query information and the keyword information. In addition, the electronic apparatus may generate the index homomorphic encryption by performing the homomorphic calculation on the empty mask and the lookup table information. For example, the electronic apparatus may generate the index homomorphic encryption by performing homomorphic multiplication calculation on the empty mask the index information, and using the index information calculated by the multiplication.

In addition, the electronic apparatus may transmit the retrieved index homomorphic encryption to the external apparatus (S1240). For example, the electronic apparatus may transmit the retrieved index homomorphic encryption to the apparatus transmitting the query information described above.

The external apparatus receiving the index homomorphic encryption through this operation may decrypt the homomorphic encryption to thus check the index, and acquire the homomorphic encryption corresponding to the index. For example, the electronic apparatus storing the above-mentioned lookup table may also store the homomorphic encryption. In this case, the electronic apparatus may receive the index information in the plaintext from the external apparatus, and find the homomorphic encryption corresponding to the received index information to thus transmit the same to the external apparatus.

Meanwhile, in implementation, the lookup table and the homomorphic encryption may be stored in the separate apparatuses. That is, the first server apparatus 200 of FIG. 1 may store the lookup table, and the second server apparatus 300 may store the homomorphic encryption. In addition, the plurality of homomorphic encryptions may be stored in the plurality of server apparatuses. In this case, the index information may include the information for distinguishing the storage for the homomorphic encryption.

For example, the homomorphic encryptions having the index numbers from 1 to 100 may be stored in the first server apparatus, and the homomorphic encryptions having the index numbers from 101 to 200 may be stored in the second server apparatus. In this environment, each server apparatus or each electronic apparatus may pre-share the information on the storage for each index.

According to the method for processing an encryption as describe above, it is possible to retrieve the plurality of homomorphic encryptions by using the lookup table, thus performing the faster retrieval of the homomorphic encryption corresponding to the specific keyword. In addition, it is possible not only to retrieve only one homomorphic encryption for one keyword. That is, it is possible to map each keyword and each encryption not only in the 1:1 relationship but also in various ways. Accordingly, as for the retrieval result, one retrieval result may be output for one keyword, or the plurality of retrieval results may also be output for one keyword. In addition, it is possible to set not only one keyword but also the plurality of keywords for one homomorphic encryption, thus allowing easier retrieval.

Meanwhile, the method for processing an encryption according to the various embodiments described above may be implemented in the form of a program code for performing each step, stored in a recording medium, and distributed. In this case, an apparatus mounted with the recording medium may perform the operations such as the encryption or the encryption processing described above.

The recording media may be various types of computer-readable media such as a read only memory (ROM), a random access memory (RAM), a memory chip, a memory card, an external hard drive, a hard drive, a compact disk (CD), a digital versatile disk (DVD), a magnetic disk, and a magnetic tape.

Although the present disclosure has been described with reference to the accompanying drawings, the scope of the present disclosure is determined by the claims described below and should not be construed as being limited to the above-described embodiments or drawings. In addition, it should be clearly understood that improvements, changes, and modifications obvious to those skilled in the art of the present disclosure described in the claims are also included in the scope of the present disclosure.

The invention claimed is:

1. An electronic apparatus comprising:
a memory storing a plurality of homomorphic ciphertexts and lookup table information;
a communication apparatus configured to perform communication with an external apparatus; and
a processor configured to retrieve the homomorphic ciphertext in response to a requested query,
wherein the lookup table information stores data acquired by homomorphically encrypting keyword information and index information that respectively correspond to the plurality of homomorphic ciphertexts, and
the processor is configured to
upon receiving query information from the external apparatus, retrieve the homomorphically encrypted index information by using the received query information and the lookup table information, and
control the communication apparatus to transmit the retrieved index information to the external apparatus, the retrieved index information is homomorphically encrypted,
wherein the processor is configured to
compute a vector value having a predetermined size by applying a keyword corresponding to each homomorphic ciphertext of the plurality of homomorphic ciphertexts to a predetermined embedding model,
homomorphically encrypt each of the computed vector value and the index information, and
generate the lookup table information by respectively disposing the homomorphically encrypted vector value and index information in a plurality of slots.

2. The apparatus as claimed in claim 1, wherein the processor is configured to control the communication apparatus to transmit the homomorphic ciphertext corresponding to an index information to the external apparatus in case of receiving the index information in a plaintext from the external apparatus.

3. The apparatus as claimed in claim 1, wherein the processor is configured to
compute the plurality of keywords for each homomorphic ciphertext, and
respectively dispose the plurality of homomorphically encrypted vector values corresponding to the plurality of keywords in the plurality of slots.

4. The apparatus as claimed in claim 1, wherein the processor is configured to
generate a bin mask indicating whether the index information is masked by performing homomorphic comparison calculation on the received query information and the keyword information, and
generate an index homomorphic ciphertext by performing homomorphic calculation on the bin mask and the index information of the lookup table information.

5. The apparatus as claimed in claim 4, wherein the processor is configured to generate the index homomorphic ciphertext by performing homomorphic multiplication calculation on the bin mask and the index information, and using the index information calculated by the homomorphic multiplication.

6. The apparatus as claimed in claim 1, wherein the processor is configured to
receive, from the external apparatus, a new homomorphic ciphertext and the homomorphically encrypted keyword information for the new homomorphic ciphertext,
generate an index for the new homomorphic ciphertext,
store the received new homomorphic ciphertext in the memory, and
update the lookup table information based on the index and the keyword information.

7. A method for processing a ciphertext of an electronic apparatus, the method comprising:
storing a plurality of homomorphic ciphertexts;
storing a lookup table including data acquired by homomorphically encrypting keyword information and index information that respectively correspond to the plurality of homomorphic ciphertexts;
receiving query information from an external apparatus;
retrieving the homomorphically encrypted index information by using the received query information and lookup table information; and
transmitting the retrieved index information to an external apparatus, the retrieved index information is homomorphically encrypted
the storing of the lookup table includes
computing a vector value having a predetermined size by applying a keyword corresponding to each homomorphic ciphertext of the plurality of homomorphic ciphertexts to a predetermined embedding model,
homomorphically encrypting each of the computed vector value and the index information, and
generating the lookup table information by respectively disposing the homomorphically encrypted vector value and index information in a plurality of slots.

8. The method as claimed in claim 7, further comprising:
receiving an index information in a plaintext from the external apparatus; and
transmitting the homomorphic ciphertext corresponding to the index information to the external apparatus.

9. The method as claimed in claim 7, wherein in the computing of the vector value, the plurality of vector values corresponding to the plurality of keywords are computed for each homomorphic ciphertext, and
in the generating of the homomorphic ciphertext, the plurality of homomorphically encrypted vector values corresponding to the plurality of keywords are respectively disposed in the plurality of slots.

10. The method as claimed in claim 7, the retrieving of the index information includes
generating a bin mask indicating whether the index information is masked by performing homomorphic comparison calculation on the received query information and the keyword information, and
generating an index homomorphic ciphertext by performing homomorphic calculation on the bin mask and the index information of the lookup table information.

11. The method as claimed in claim 10, wherein in the generating of the index homomorphic ciphertext, the index homomorphic ciphertext is generated by performing homomorphic multiplication calculation on the bin mask and the index information, and using the index information calculated by the homomorphic multiplication.

12. The method as claimed in claim 7, further comprising:
receiving, from the external apparatus, a new homomorphic ciphertext and the homomorphically encrypted keyword information for the new homomorphic ciphertext;
generating an index for the new homomorphic ciphertext;
storing the received new homomorphic ciphertext; and
updating the lookup table information based on the index and the keyword information.

13. A non-transitory computer-readable recording medium storing a program thereon for executing the program to process a ciphertext, wherein the method includes:
storing a plurality of homomorphic ciphertexts;
storing a lookup table including data acquired by homomorphically encrypting keyword information and index information that respectively correspond to the plurality of homomorphic ciphertexts;
receiving query information from an external apparatus;
retrieving the homomorphically encrypted index information by using the received query information and lookup table information; and
transmitting the retrieved index information to an external apparatus, the retrieved index information is homomorphically encrypted
the storing of the lookup table includes
computing a vector value having a predetermined size by applying a keyword corresponding to each homomorphic ciphertext of the plurality of homomorphic ciphertexts to a predetermined embedding model,
homomorphically encrypting each of the computed vector value and the index information, and
generating the lookup table information by respectively disposing the homomorphically encrypted vector value and index information in a plurality of slots.

* * * * *